US 6,621,180 B2

(12) United States Patent
Dishman et al.

(10) Patent No.: US 6,621,180 B2
(45) Date of Patent: Sep. 16, 2003

(54) METHOD AND SYSTEM FOR MAINTAINING FULL POWER DURING A POWER INTERRUPTION IN A MULTIPLE POWER SUPPLY SYSTEM

(75) Inventors: Cecil C. Dishman, Raleigh, NC (US); William Hemena, Raleigh, NC (US); Eino A. Lindfors, Durham, NC (US); Randhir S. Malik, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 119 days.

(21) Appl. No.: 09/839,043

(22) Filed: Apr. 20, 2001

(65) Prior Publication Data

US 2002/0153777 A1 Oct. 24, 2002

(51) Int. Cl.[7] .................................................. H02J 9/06
(52) U.S. Cl. ........................................................ 307/64
(58) Field of Search ................................ 307/64–66, 87

(56) References Cited

U.S. PATENT DOCUMENTS

| | | | | | |
|---|---|---|---|---|---|
| 3,835,333 A | * | 9/1974 | Balan | ............................ | 307/64 |
| 4,788,449 A | | 11/1988 | Katz | | |
| 5,029,285 A | * | 7/1991 | Bobry | ............................ | 307/64 |
| 5,138,184 A | * | 8/1992 | Keefe | ........................... | 433/195 |
| 5,319,536 A | * | 6/1994 | Malik | ............................ | 363/65 |
| 5,565,714 A | * | 10/1996 | Cunningham | ................ | 307/112 |
| 5,679,985 A | * | 10/1997 | Brailey et al. | ................. | 307/18 |
| 5,745,670 A | * | 4/1998 | Linde | ............................ | 714/22 |
| 5,790,394 A | * | 8/1998 | Cabaniss et al. | ............... | 363/65 |
| 5,894,415 A | * | 4/1999 | Habegger | ..................... | 363/65 |
| 5,917,253 A | * | 6/1999 | Rusnack | ....................... | 307/64 |
| 6,011,327 A | | 1/2000 | Cook et al. | | |
| 6,031,298 A | | 2/2000 | Lo et al. | | |
| 2002/0145339 A1 | * | 10/2002 | Liu et al. | ....................... | 307/77 |
| 2002/0153777 A1 | * | 10/2002 | Dishman et al. | ............... | 307/64 |

FOREIGN PATENT DOCUMENTS

EP          000833424 A2 *  4/1998   ............. H02J/9/06

* cited by examiner

*Primary Examiner*—Gregory J. Toatley, Jr.
(74) *Attorney, Agent, or Firm*—Sawyer Law Group

(57) ABSTRACT

A power supply system for providing power to a load is disclosed. The power supply system comprises a plurality of sources and a plurality of power supplies. Each of the plurality of power supplies has an input and an output. Each of the plurality of power supplies are coupled to one of the plurality of sources. One of the plurality of power supplies provides a power status signal. The outputs of the plurality of power supplies are coupled together. The power supply system includes a switching circuit coupled to the plurality of sources and receives the power status signal. The power supply system further includes a back up power supply. The back up power supply has an input and an output. The input of the back up power supply is coupled to the switching circuit. The output of the back up power supply is coupled to the output of the plurality of power supplies. The switching circuit monitors the power status signal and switches in the back up power supply when a power interruption occurs. With the present invention, full power is maintained in a power supply arrangement that includes parallel power supplies powered by separate AC sources via separate line cords. The aspects of the present invention provide an effective and efficient solution in a straightforward manner.

13 Claims, 3 Drawing Sheets

METHOD AND SYSTEM FOR MAINTAINING FULL POWER DURING A POWER INTERRUPTION IN A MULTIPLE POWER SUPPLY SYSTEM

FIELD OF THE INVENTION

The present invention relates to a multiple power supply system, and more particularly to providing full power in the event of a power interruption in a multiple power supply system powered by separate line sources.

BACKGROUND OF THE INVENTION

While the size and speed of electronic components have received much focus and attention in the advancement of digital technology, ensuring proper power delivery to the components has remained a concern. The various branches within a system that rely on a power supply tend to be numerous and require differing levels of power. As the number of components within a system increases, the chance for failures and damage to the power supply of a system also increases.

The use of two line cords which are coupled to two separate supplies is becoming very popular with customers who need high availability for AC sources as well as AC-DC regulators. One approach is to use the two power supplies operating in redundant mode with each power supply connected to a separate AC source. If either one of the power supplies or the AC sources becomes defective, the system continues to operate normally through the remaining power supply and source. However, such an arrangement does not have scalability and fails to provide full power to the components when a power interruption event occurs.

Accordingly, a need exists for a technique that provides full power to a component in the event of a power interruption in a multiple power supply system powered by separate line sources. The present invention addresses such a need.

SUMMARY OF THE INVENTION

A power supply system for providing power to a load is disclosed. The power supply system comprises a plurality of sources and a plurality of power supplies. Each of the plurality of power supplies has an input and an output. Each of the plurality of power supplies are coupled to one of the plurality of sources. One of the plurality of power supplies provides a power status signal. The outputs of the plurality of power supplies are coupled together. The power supply system includes a switching circuit coupled to the plurality of sources and receives the power status signal. The power supply system further includes a back up power supply. The back up power supply has an input and an output. The input of the back up power supply is coupled to the switching circuit. The output of the back up power supply is coupled to the output of the plurality of power supplies. The switching circuit monitors the power status signal and switches in the back up power supply when a power interruption occurs.

With the present invention, full power is maintained in a power supply arrangement that includes parallel power supplies powered by separate AC sources via separate line cords. The aspects of the present invention provide an effective and efficient solution in a straightforward manner. These and other advantages of the aspects of the present invention will be more fully understood in the following detailed description in conjunction with the accompanying drawings.

DETAILED DESCRIPTION OF THE INVENTION

The present invention relates to a multiple power supply system, and more particularly to providing full power in the event of a power interruption in a multiple power supply system powered by separate line sources. The following description is presented to enable one of ordinary skill in the art to make and use the invention and is provided in the context of a patent application and its requirements. Thus, the present invention is not intended to be limited to the embodiment shown, but is to be accorded the widest scope consistent with the principles and features described herein.

Figure 1:
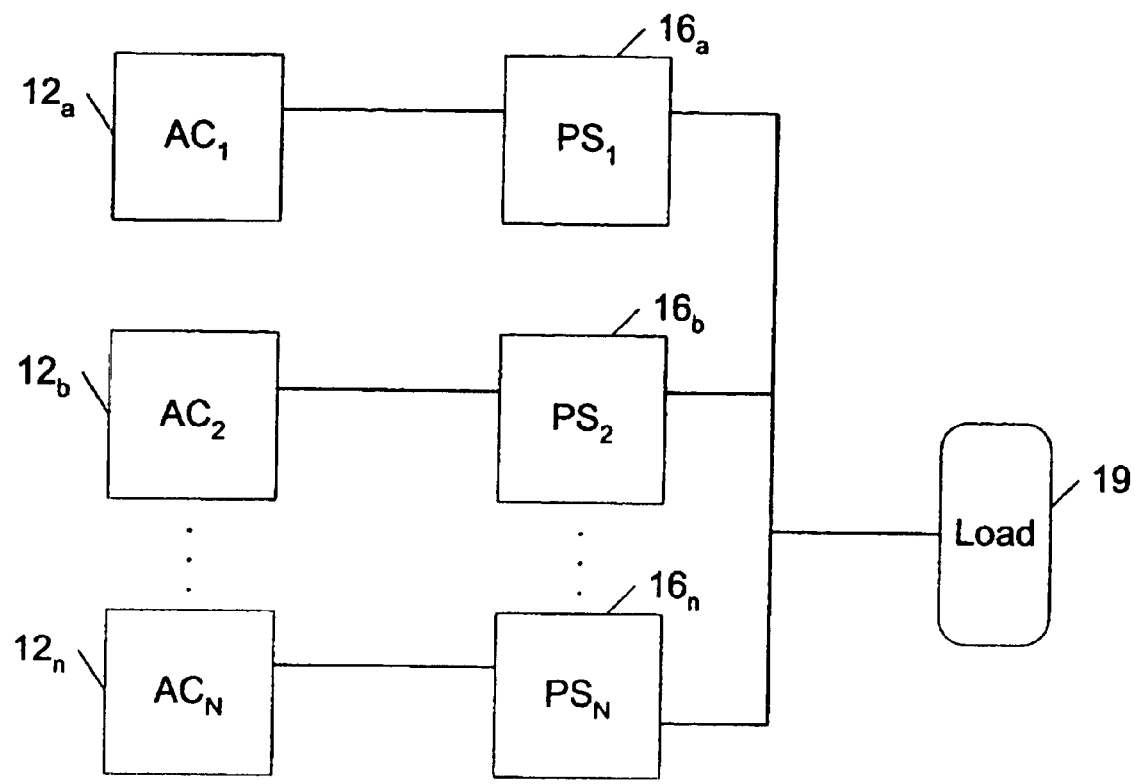
FIG. 1 illustrates a simple diagram of a conventional power supply system.

FIG. 1 illustrates a simple diagram of a conventional power supply system. Each of a plurality of power supplies 16a–16n are coupled to a respective AC service 12a–12n. The outputs of the supplies 16a–16n are coupled in parallel to a load 19. For example, the plurality of power supplies 16a–16n are coupled to a load which can receive 200 watts total. As before described, if one of the power supplies or AC sources are defective a power interruption can occur. Accordingly, a system and method in accordance with the present invention overcomes this power interruption problem.

In accordance with the present invention, a power status signal from one of a plurality of power supplies is utilized by a switching circuit and back up power supply arrangement to ensure full power in the event of a power interruption.

Figure 2:
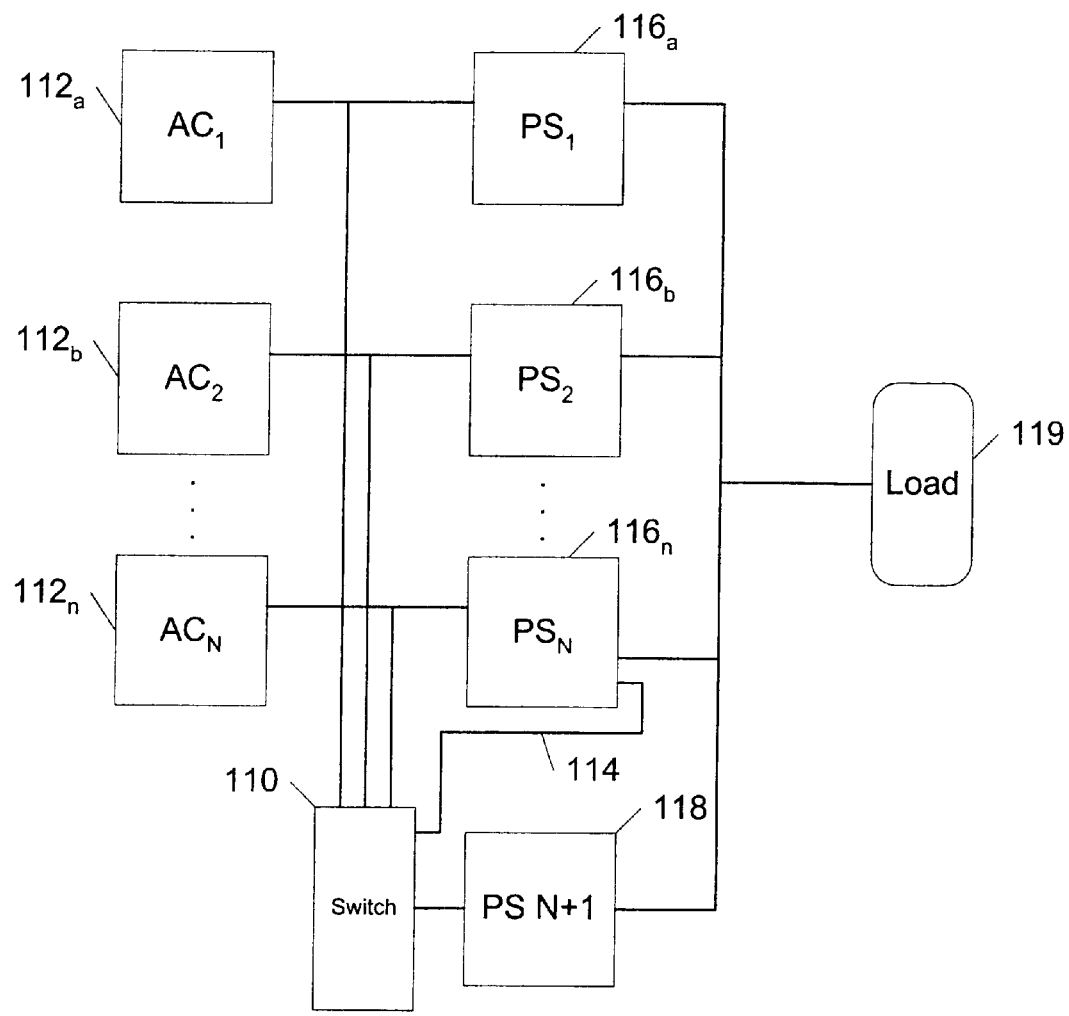
FIG. 2 illustrates a simple diagram of a power supply system in accordance with the present invention.

FIG. 2 illustrates a simple diagram of a power supply system in accordance with the present invention. Each of a plurality of power supplies 116a–116n are coupled to an AC source 112a–112c. The outputs of the supplies 116a–116n are coupled to a load 119. A switch 110 receives signals from the output of each of the AC sources 112a–112c and is coupled to a back up power supply 118. The output of the backup power supply 118 is also coupled to the load 119.

In this embodiment, the switching circuit 110 transfers the control from one of the AC sources 112a–112n to another based on a power status signal 114 from one of the power supplies 116a–116n connected in parallel. If the power status signal 114 is present, no action is taken. In this way, all of the power supplies 116a–116n are operating in parallel and sharing load current for a load 119, e.g., a DC bus of a computer system. For example, if 116n power supply input is connected to power supply 118 via switching circuit 110, signal 114 will come from 116n to activate the switching circuit 110. In case of a power interruption, full power is still available from the remaining power supplies through the switching operation of the switching circuit 110 in cooperation with the back up power supply 118. A power interruption includes loss of power due to an interruption in any one of the AC lines of the AC sources 112 or due to one of the power supplies 116 becoming defective.

Figure 3:
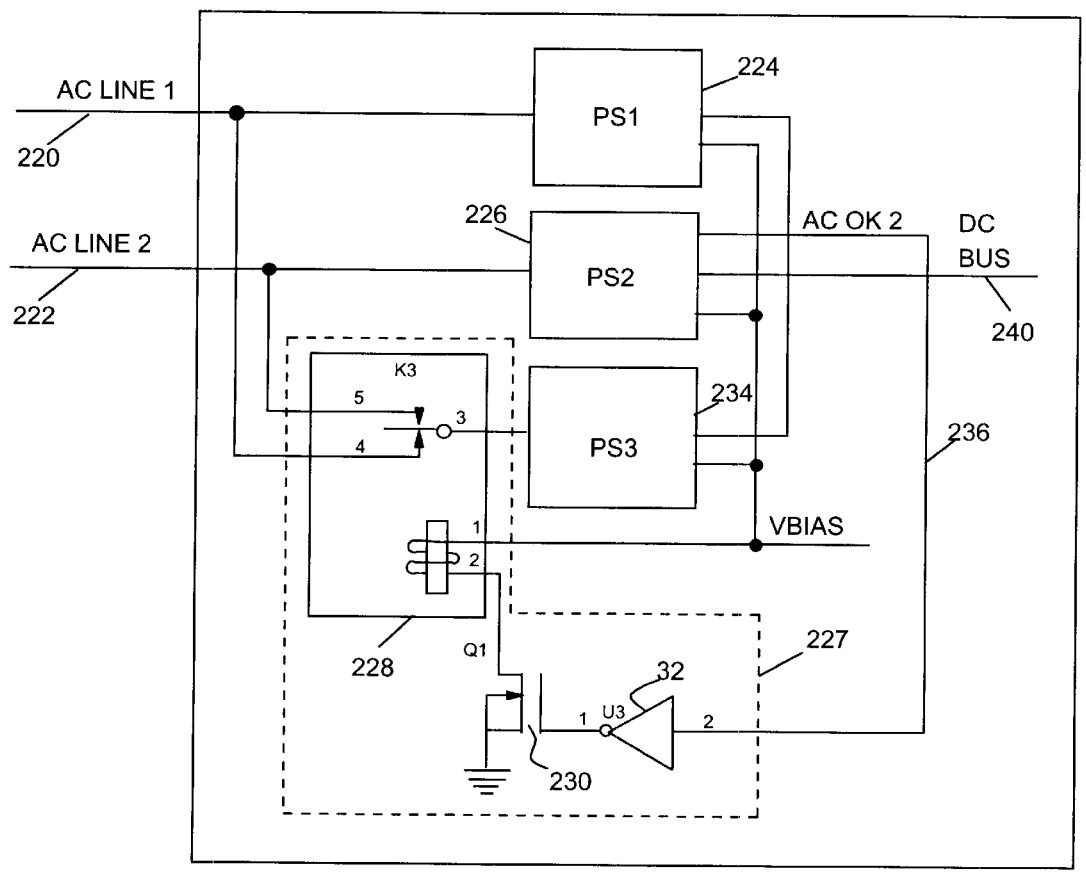
FIG. 3 is a detailed description of a preferred embodiment of a power supply system in accordance with the present invention.

FIG. 3 is a detailed description of a preferred embodiment of a power supply system in accordance with the present invention. First and second AC lines 220 and 222, e.g., AC line 1 and AC line 2, are shown and represent two line cords that are individually connected to their respective AC sources (not shown). AC line 220 powers a first power supply 224, PS1, while AC line 222 powers a second power supply 226, PS2. AC line 220 and AC line 222 are further coupled to switching circuit 227 that includes a relay switch 228 coupled at a contact 2 to a transistor 230, which is coupled to a logic mechanism 232, e.g., an inverter. AC line 220 is connected to a contact 5 of relay switch 228, while the AC line 222 is connected to contact 4 of relay switch 228. Contact 3 of relay switch 228 is connected to the input of a third power supply 234, PS3, that acts as a backup power supply in parallel with the first and second power supplies 224 and 226. Contact 1 of relay switch 228 receives a bias voltage (VBIAS) output from the parallel-connected power supplies, PS1, PS2, and PS3.

In operation, a power status signal line 236, AC OK 2, is utilized via the switching circuit to ensure full power by the parallel arrangement of power supplies when a power interruption occurs. When the first and second AC lines 220 and 222 are present and all of the power supplies 224 and 226 are connected, the AC OK 2 signal will be at a "HIGH" logic level and drive the output of the inverter 232 to a "LOW" logic level. Thus, with the output of the inverter coupled to the gate of the transistor 230, the low level signal output from inverter 232 keeps transistor 230 off. Therefore, the relay switch 228 is not energized, and contact 3 continues to stay in contact with contact 5. In this manner, power is received from AC line 222. In this case, the three power supplies would provide the appropriate power to load 240.

When a power interruption due to AC line 222 going down or the power supply 226 becomes defective, the AC OK 2 signal will be at a "LOW" logic level, which drives the output of inverter 232 to a "HIGH" logic level. In turn, the transistor 230 is turned on, which energizes the relay contact 3 to make a contact with contact 4 which is connected to AC line 220. With the switch, the power supplies 224 and 234 maintain the delivery of full power to the DC bus. When a power interruption occurs due to AC line 220 going down or power supply 224 becoming defective, while AC line 222 is up, the power status line 236, the AC OK 2 will be active "HIGH" driving the output of inverter 232 "LOW", keeping transistor 230 off, and keeping the backup power supply 234 still connected to AC line 222. Thus, two power supplies 226 and 234, PS2 and PS3, are providing the full power.

Thus, through the present invention, full power is maintained in a power supply arrangement that includes a switching circuit and a backup power supply in parallel with power supplies powered by separate AC sources via separate line cords. The aspects of the present invention provide an effective and efficient solution in a straightforward manner. Further, while two separate line cords represents a typical environment where the present invention finds particular application, the features of the present invention are readily scalable to accommodate other arrangements as needed, as is well appreciated by those skilled in the art.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A power supply system for providing power to a load comprising:

a plurality of sources;

a plurality of power supplies, each of the plurality of power supplies having an input and an output; each of the plurality of power supplies being coupled to one of the plurality of sources, one of the plurality of power supplies providing a power status signal; the outputs of the plurality of power supplies being coupled together;

a switching circuit coupled to the plurality of sources and coupled to the plurality of power supplies for receiving a bias voltage signal output from the plurality of power supplies and for receiving the power status signal; and a back up power supply, the back up power supply having an input and an output, the input of the back up power supply being coupled to the switching circuit and the output of the back up power supply being couple to the output of the plurality of power supplies, wherein the switching circuit monitors the power status signal and switches in the back up power supply when a power interruption occurs.

2. The power supply system of claim 1 wherein the plurality of power supplies and at least one backup power supply are coupled in a parallel arrangement.

3. The power system of claim 1 wherein the switching circuit further comprises a logic element, a transistor coupled to the logic element, and a relay switch coupled to the transistor, the plurality of sources and the backup power supply.

4. The power system of claim 3 wherein the logic means provides a gate voltage signal to the transistor.

5. The power system of claim 4 wherein when the transistor is on, the relay switch is energized to switch.

6. The power system of claim 3 wherein the logic element comprises an inverter.

7. A power supply system powered by separate line sources protected from power interruption comprising:

a first power supply coupled to a first AC power source and providing a first output;

a second power supply coupled to a second AC power source and providing a second output wherein one of the first and second power supplies provides a power status signal;

a switching circuit coupled to the first and second AC sources and for receiving the power status signal; and a third power supply having a third output, the third output being coupled to the first and second outputs, the third power supply also being coupled to the switching circuit to maintain full power when a power interruption occurs to one of the first and second power supplies, wherein the switching circuit receives a bias voltage signal output from the first, second, and third power supplies.

8. The power supply system of claim 7 wherein the first, second, and third power supplies are coupled in a parallel arrangement.

9. The power supply system of claim 7 wherein the switching circuit further comprises a logic element, a transistor coupled to the logic element, and a relay switch coupled to the transistor, the plurality of sources and the backup power supply.

10. The power supply system of claim 7 wherein the logic element comprises an inverter.

11. The power supply system of claim 9 wherein the logic element provides a gate voltage signal to the transistor.

12. The power supply system of claim 11 wherein when the transistor is on, the relay switch is energized to switch.

13. A power supply system powered by separate line sources protected from power interruption comprising:

a first power supply coupled to a first AC power source and providing a first output;

a second power supply coupled to a second AC power source and providing a second output wherein one of the first and second power supplies provides a power status signal;

a switching circuit coupled to the first and second AC sources and for receiving the power status signal; and a third power supply having a third output, the third output being coupled to the first and second outputs, the third power supply also being coupled to the switching circuit to maintain full power when a power interruption occurs to one of the first and second power supplies, wherein the first, second, and third power supplies are coupled in a parallel arrangement, wherein the switching circuit further comprises a logic element, a transistor coupled to the logic element, wherein the logic element comprises an inverter, and a relay switch coupled to the transistor, the plurality of sources and the third power supply, and coupled to the first, second, and third power supplies or receiving a bias voltage signal output from the first, second, and third power supplies, wherein the logic element provides a gate voltage signal to the transistor, wherein when the transistor is on, the relay switch is energized to switch.

* * * * *